United States Patent
Kim et al.

(10) Patent No.: US 6,841,911 B2
(45) Date of Patent: Jan. 11, 2005

(54) MACHINE TOOL

(75) Inventors: Houng Joong Kim, Hitachi (JP);
Toshiaki Okuyama, Tokai-mura (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 10/083,531

(22) Filed: Feb. 27, 2002

(65) Prior Publication Data

US 2002/0117922 A1 Aug. 29, 2002

(30) Foreign Application Priority Data

Feb. 28, 2001  (JP) ........................................ 2001-053428

(51) Int. Cl.⁷ .............................................. H02K 16/02
(52) U.S. Cl. ........................ 310/114; 310/191; 310/59
(58) Field of Search ................... 310/114, 209, 310/191, 156.25, 156.24, 156.16, 156.17, 156.18, 156.08, 156.12, 156.15, 254, 59

(56) References Cited

U.S. PATENT DOCUMENTS

| | | | | |
|---|---|---|---|---|
| 5,177,391 A | * | 1/1993 | Kusase ........................ | 310/263 |
| 5,387,061 A | * | 2/1995 | Barkman et al. ............. | 409/80 |
| 5,562,528 A | * | 10/1996 | Ueyama et al. ............... | 451/11 |
| 5,821,710 A | * | 10/1998 | Masuzawa et al. ......... | 318/524 |
| 6,508,614 B1 | * | 1/2003 | Ozaki et al. ................. | 409/231 |
| 6,541,877 B2 | * | 4/2003 | Kim et al. .................... | 290/44 |
| 2002/0047319 A1 | * | 4/2002 | Ferrari et al. ................. | 310/12 |
| 2002/0116961 A1 | * | 8/2002 | Kim et al. .................... | 68/23.7 |
| 2002/0117922 A1 | * | 8/2002 | Kim et al. ................... | 310/114 |
| 2002/0117926 A1 | * | 8/2002 | Joong et al. ................. | 310/191 |
| 2002/0117927 A1 | * | 8/2002 | Kim et al. ................... | 310/191 |
| 2002/0117933 A1 | * | 8/2002 | Joong et al. ................. | 310/261 |
| 2002/0158520 A1 | * | 10/2002 | Takamune et al. ............ | 310/20 |

FOREIGN PATENT DOCUMENTS

| | | | | |
|---|---|---|---|---|
| JP | 1085644 | * | 8/2000 | .......... H02K/16/02 |
| JP | 2001069609 | * | 3/2001 | .......... H02K/16/02 |
| JP | 200262488 | * | 9/2002 | .......... H02K/16/02 |
| JP | 2002262487 | * | 9/2002 | .......... H02K/16/02 |
| JP | 2002262489 | * | 9/2002 | .......... H02K/16/02 |
| JP | 2002262493 | * | 9/2002 | .......... H02K/16/02 |
| JP | 2002262494 | * | 9/2002 | .......... H02K/16/02 |
| JP | 2003244874 | * | 8/2003 | ............ H02K/1/27 |

* cited by examiner

*Primary Examiner*—Burton S. Mullins
*Assistant Examiner*—Heba Elkassabgi
(74) *Attorney, Agent, or Firm*—Crowell & Moring LLP

(57) ABSTRACT

A machine tool provided with an electric motor which can maintain the fixed output power in a wide speed range. The electric motor has a stator having a primary winding, and a rotor having a field magnet and a shaft, said field magnet comprising a first field magnet having different polarity magnetic poles sequentially arranged in a rotating direction and a second field magnet having different polarity magnetic poles sequentially arranged in a rotating direction, and a mechanism for shifting one field magnet in axial and rotating directions with respect to the other field magnet, whereby a composite magnetic field of said first and said second field magnets is changed.

14 Claims, 14 Drawing Sheets

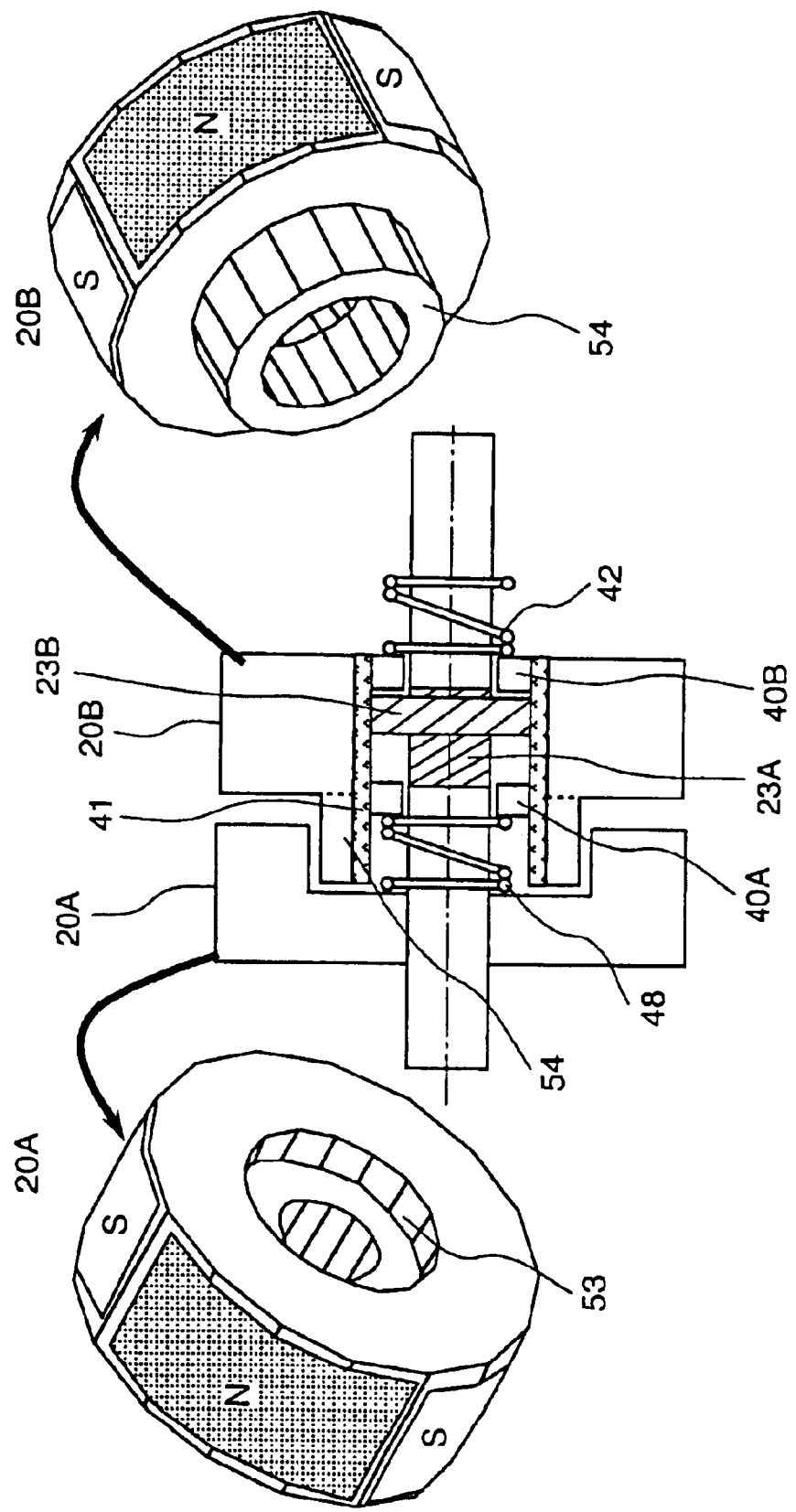

MACHINE TOOL

BACKGROUND OF THE INVENTION

This application claims the priority of Application No. 2001-53428, filed Feb. 28, 2001, in Japan, the disclosure of which is expressly incorporated by reference herein.

The present invention relates to an electric motor which uses a permanent magnet as a field magnet, and particularly to an electric motor and a control method by which the machine tool is driven or an electric power is generated.

In a permanent magnet type electric motor of the prior art, an induced electromotive force E is determined by a constant magnetic flux Φ generated by a permanent magnet arranged in a rotor and a rotating angular speed ω of the motor. That is, when the rotating angular speed ω (rotating speed) of the motor is increased, the induced electromotive force is proportionally increased.

Accordingly, high torque can be obtained in a low speed range, but the output voltage of the inverter is limited because the induced electromotive force increases as the number of revolution increases. As a result, the operation Therefore, the high-speed operation range is widened using a field weakening control technology.

Moreover, the main shaft motor of a machine tool is provided with a gear mechanism to maintain the fixed output in a wide speed range to deal with various conditions of working. Recently, such a motor is driven after the winding for each phase of the main shaft motor is changed-over between the winding for low speed and the winding for high speed according to the rotational speed of the main shaft by using a winding change-over unit.

Although it is possible to extend a high speed drive range by using the field weakening control described in the prior art, that is, by using the magnetic flux weakening current (d-shaft current of an armature) in a permanent magnet type electric motor, there is a limit because of the heat generation due to the current or the decrease in efficiency.

Moreover, although it is desirable to rotate the motor at high speed when material hard to cut like aluminum alloy is worked, there is a limit because of the increase in the induced electromotive force of the permanent magnet.

When the gear mechanism, etc. are provided to maintain the predetermined output power in the wide speed range, the number of mechanical parts increases, and the problems on noise or mechanical vibration occurs.

When a winding change-over device for changing-over the winding of each phase according to the rotational speed of the main shaft, the number of lead wires from the main body of the electric motor increases, and the configuration of the winding change-over device becomes complicated.

SUMMARY OF THE INVENTION

An object of the present invention is to provide a machine tool provided with a motor which can maintain the fixed output power in a wide speed range.

In the present invention, the following machine tool is used. The machine tool comprises: a main shaft for installing a tool, an electric motor provided at the shaft head, for rotating said main shaft, an electric drive circuit (inverter) for driving said electric motor, a controller for controlling said inverter, and a tool data setting means for pre-setting the magnitude of the power output of said electric motor which is suitable for the working condition of each said tool used, the desired working being done to a work piece by moving relatively said tool and said work piece said electric motor comprises a stator having a primary winding, and a rotor having a field magnet and a shaft, said field magnet comprising a first field magnet having different polarity magnetic poles sequentially arranged in a rotating direction and a second field magnet having different polarity magnetic poles sequentially arranged in a rotating direction, and a mechanism for shifting one field magnet in axial and rotating directions with respect to the other field magnet, whereby a composite magnetic field of said first and said second field magnets is changed.

Other objects, advantages and novel features of the present invention will become apparent from the following detailed description of the invention when considered in conjunction with the accompanying drawings.

BRIEF DESCRIPTION OF THE DRAWINGS

FIG. 10 is a view showing the inside of a rotor of another embodiment of a motor in accordance with the present invention.

DETAILED DESCRIPTION OF THE PREFERRED EMBODIMENTS

Embodiments of the present invention are explained hereinafter.

Figure 1:
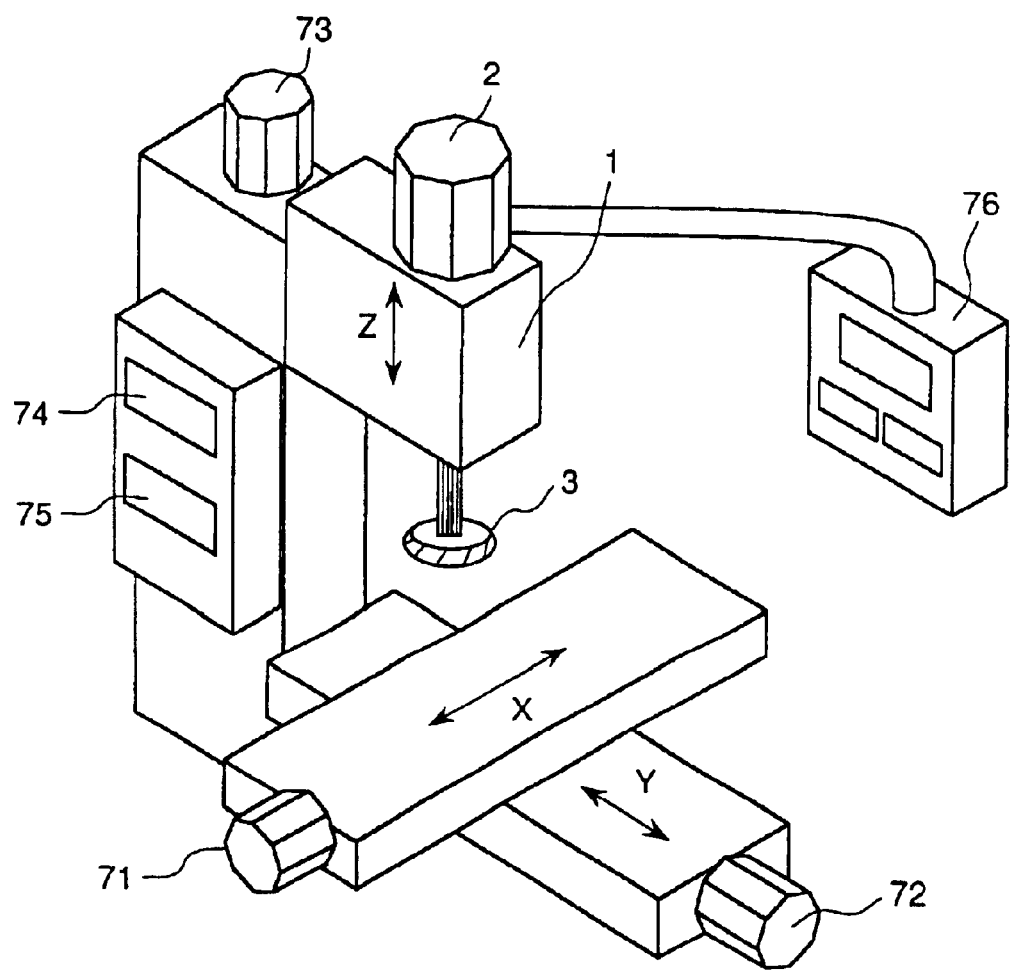
FIG. 1 is a view showing the layout of an electric motor and a machine tool according to the present invention.

FIG. 1 shows the outline of the machine tool in which the permanent magnet type synchronous motor according to this embodiment is provided.

The machine tool comprises main shaft 1 for installing tool 3 shown in FIG. 1, main shaft electric motor 2 for rotating said main shaft, electric drive circuit (inverter) 74 for driving said main shaft electric motor 2, controller 75 for controlling said inverter, and operating pendant 76 or a tool data setting means for pre-setting the magnitude of the power output of said electric motor which is suitable for the working condition of each said tool used, and X-axis feeding motor 71, Y-axis feeding motor 72, and Z-axis feeding motor 73, for moving relatively said tool and said work piece. Here, a tool exchanging device is omitted.

In such configuration, the main shaft motor, each axis feeding motor, etc. are driven according to a tool data and a working instruction set by operating pendant 76. Further, main shaft motor 2 is rotated at a widely variable speed according to the kind of tools, the material of workpiece, and work.

Figure 2:
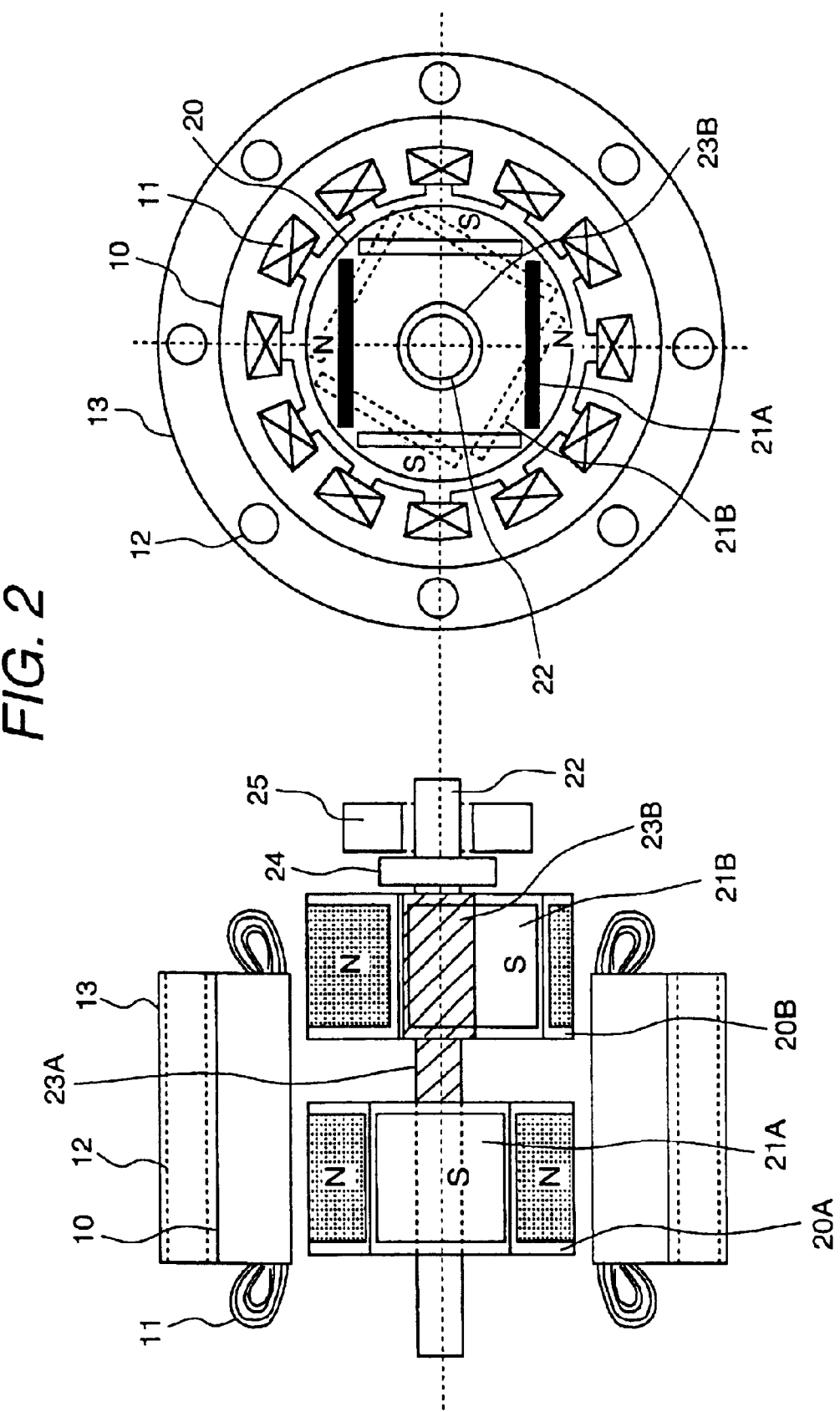
FIG. 2 is a schematic view showing the whole configuration of the motor in FIG. 1.

FIG. 2 is a schematic view showing a case where the centers of equal-polarity of the rotor of the motor shown in FIG. 1 are out of phase.

Armature windings 11 are wound and set inside slots of stator core 10, and bonded to housing 13 having cooling paths 12 inside of which coolant flows.

The rotor of permanent magnet embedded type 20 is composed of first rotor 20A fixed to shaft 22 and second rotor 20B provided movably and freely with respect to shaft 22. Of course, the rotor may be a rotor of a surface magnet type instead of the rotor of a permanent magnet embedded type.

In first rotor 20A, permanent magnets 21A are arranged so as to be alternatively aligned magnetic poles of different polarity in the rotating direction. Similarly, in first rotor 20B, permanent magnets 21B are arranged so as to be alternatively aligned magnetic poles of different polarity in the rotating direction. The field magnets coaxially arranged in the two rotors of the first and the second rotors are opposite to magnetic poles of the stator.

Nut portion 23B is formed in the inner side of second rotor 20B, and bolt screw portion 20A to be in contact with nut portion 23B is formed in the shaft. By connecting second rotor 20B with the shaft with the screw function, second rotor 20B is movable in the axial direction while being rotated with respect to the shaft.

Further, stopper 24 is arranged at a position apart from the side surface of second rotor 20B so that second rotor 20B may not exceed a preset displacement from the center of the stator. Furthermore, by providing a servomechanism of actuator 25 for driving the stopper to make the stopper movable in the direction of shaft axis, the displacement between the magnetic pole centers of the first field magnet and the second field magnet can be varied. As the result, it is possible to control the total effective magnetic flux composed of the first field magnet and the second field magnet to the stator having the armature windings in the slits.

Description will be made below on that the effective magnetic flux of the permanent magnets can be varied corresponding to the direction of torque by doing as described above.

In an electric motor basically using armature windings in the stator and permanent magnets in the rotor, in the case that the rotating direction of the rotor is the same between when the motor is working as a motor and when working as a generator (regenerative braking), the direction of the torque acting on the rotor becomes opposite between when the motor is working as a motor and when working as a generator.

On the other hand, in the case that the motor is working as a motor, the direction of the torque is reversed when the rotating direction of the rotor is reversed. Similarly, in the case that the motor is working as a generator, the direction of the torque is reversed when the rotating direction of the rotor is reversed.

When the basic theory in regard to the rotating direction and the torque direction described above is applied to the motor of the machine tool according to an embodiment of the present invention, the following can be said.

Figure 3:
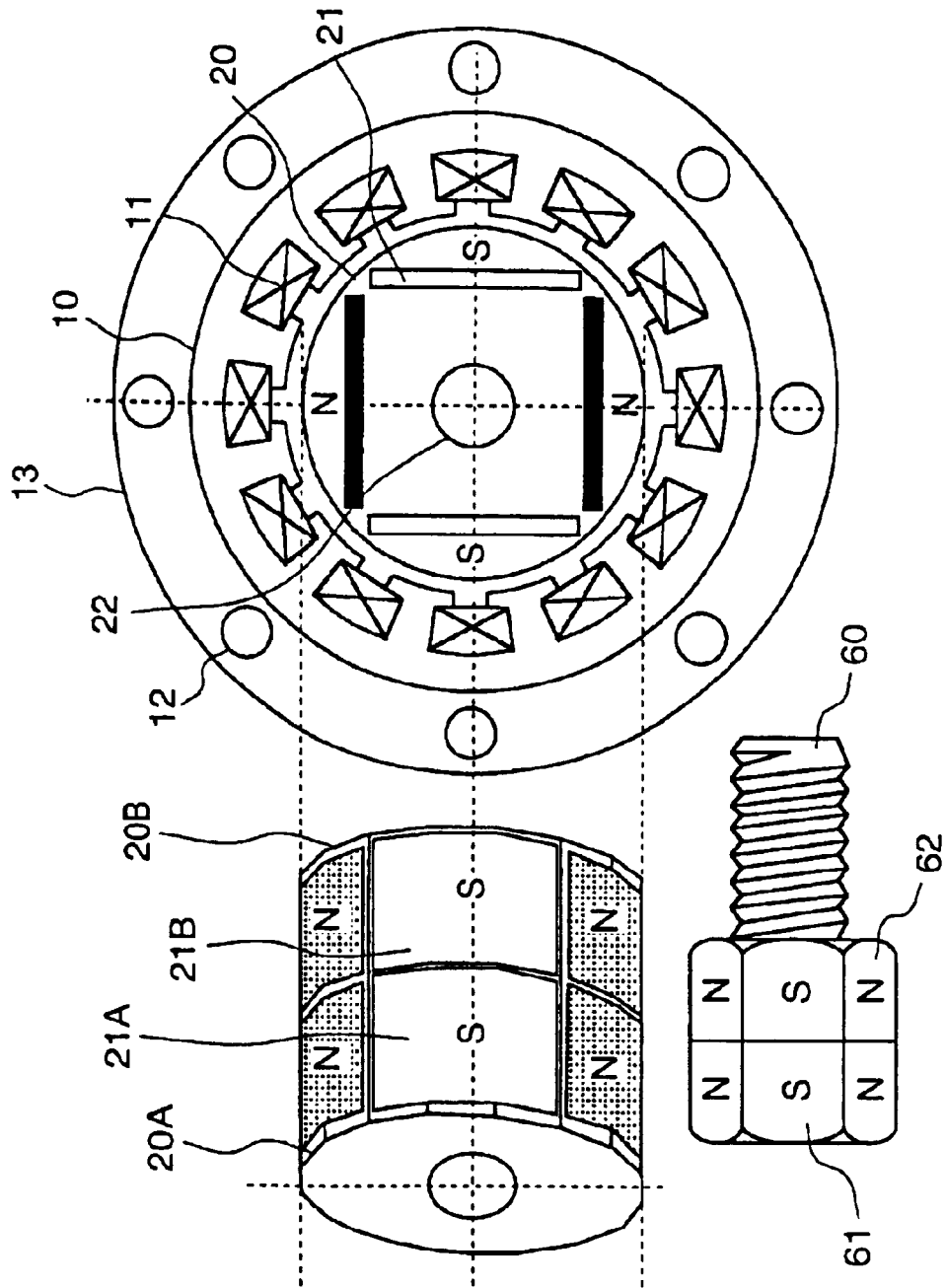
FIG. 3 is a schematic view showing a case where magnetic pole centers of equal-polarity of the rotor of the motor in FIG. 1 are in phase.

When the machine tool is driven in the low rotating speed region in which a big torque is needed, the high torque characteristic is obtained by compulsorily making the centers of equal-polarity of first rotor 20A and second rotor 20B arranged, and increasing the amount of the effective magnetic flux by the stator magnetic pole and the opposed permanent magnet as shown in FIG. 3.

Figure 4:
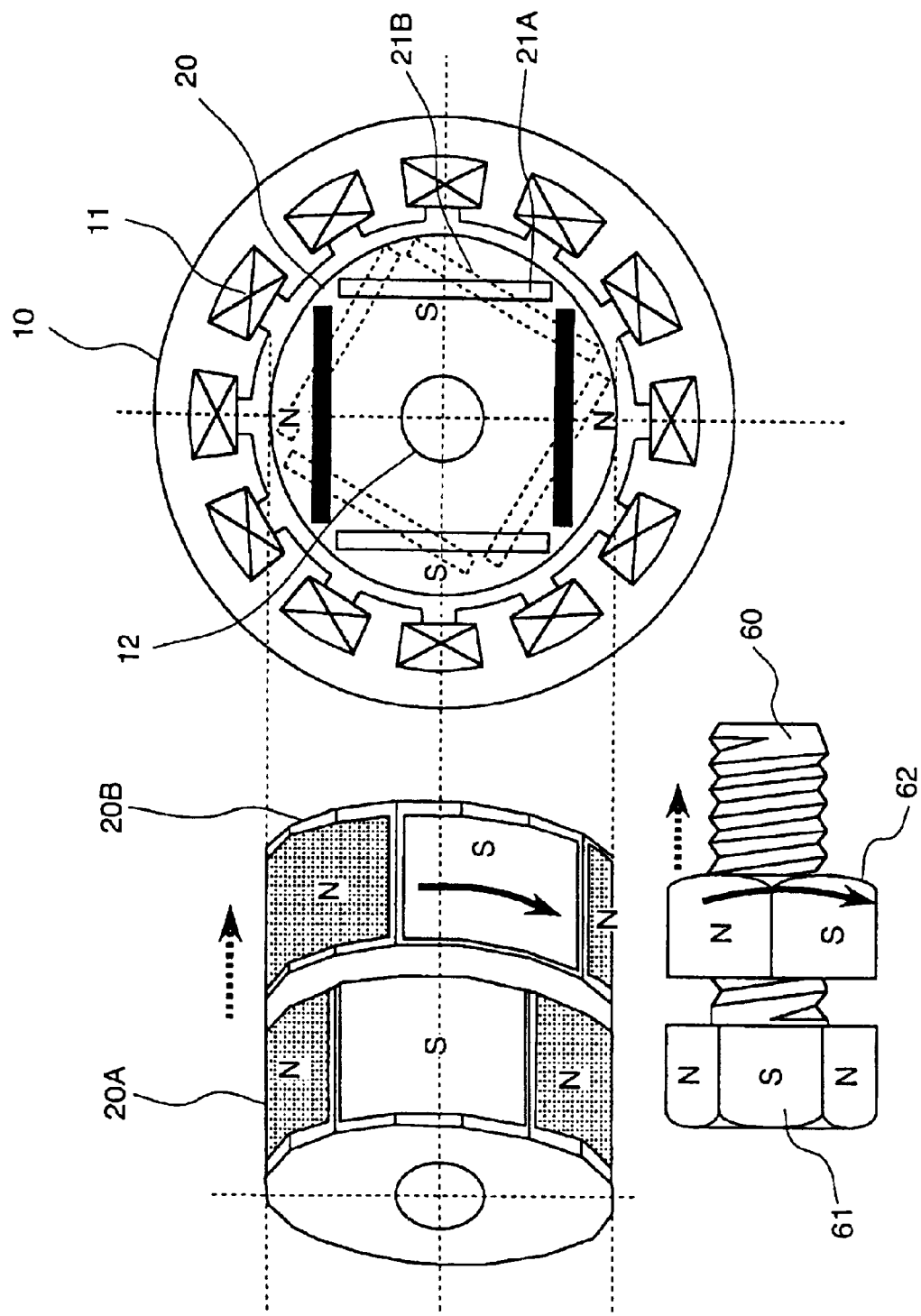
FIG. 4 is a schematic view showing a case where magnetic pole centers of equal-polarity of the rotor of the motor in FIG. 1 are out-of phase.

Next, when the electric motor is operated in a high rotating speed range, for example, when material hard to cut like aluminum alloy for air craft is worked, the centers of equal-polarity of first rotor 20A and second rotor 20B are brought out of phase while second rotor 20B is being moved with respect to shaft 22 to widen the gap between first rotor 20A and second rotor 20A as if the nut portion were screwed off from the bolt screw portion, as shown in FIG. 4. Therefore, the effective magnetic flux by the stator magnetic poles and the opposite permanent magnets is decreased. In other words, there is the weakening magnetic field effect, and a high output power characteristic can be obtained in the high rotating range.

FIG. 4 schematically shows the state that the effective magnetic flux by the stator magnetic poles and the opposite permanent magnets is decreased by making the centers of equal-polarity of first rotor 20A and second rotor 20A out of phase while the gap between first rotor 20A and second rotor 20B is being widened.

In FIG. 3 and at the left lower portion of FIG. 4, there are associative illustrations of head portion 61 of a bolt, bolt screw portion 60 and nut portion 62. The head portion 61 of the bolt corresponds to first rotor 20A, nut portion 62 corresponds to second rotor 20B. When bolt screw portion 60 (corresponding to part 23A in FIG. 2) is rotating a direction, the nut portion 62 is fastened or unfastened depending on the direction of torque acting on nut portion 62. The similar phenomenon occurs in second rotor 20B depending on the direction of torque acting on the rotor.

On the other hand, in the case that the motor is working as an electric motor, the directions of the torque in the forward rotation and the backward rotation are opposite each other. Therefore, if FIG. 3 shows the state of the forward rotation, FIG. 4 shows the state of the backward rotation.

Nut portion 23B is formed in the inner side of second rotor 20B, and bolt screw portion 20A to be in contact with nut portion 23B is formed in the shaft. Both of them are connected by using the screw function. Although the states shown in FIGS. 3 and 4 are opposite each other if the direction of the screw is reversed (for instance, from a left screw to a right screw), the same effect is obtained. Second rotor 20B is movable in the axial direction while being rotated with respect to the shaft.

When the electric motor is operated in low rotating speed range where high torque is needed in the forward rotation operation, it is possible to obtain the high torque characteristic by making the centers of equal-polarity magnetic poles of first rotor 20A and second rotor 20B are made in phase to increase the effective magnetic flux by the stator magnetic poles and the opposite permanent magnets, as shown in FIG. 3.

Next, when the electric motor is operated in a high rotating speed range, for example, when material hard to cut like aluminum alloy is worked in the backward rotation, the centers of equal-polarity of first rotor 20A and second rotor 20B are brought out of phase while second rotor 20B is being moved with respect to shaft 22 to widen the gap between first rotor 20A and second rotor 20B as if the nut portion were screwed off from the bolt screw portion, as shown in FIG. 4. Therefore, the effective magnetic flux by the stator magnetic poles and the opposite permanent magnets is decreased. In other words, there is the weakening magnetic field effect, and a constant output power characteristic can be obtained in the high rotating range.

Description will be made below on operation of the induced electromotive force by the electric motor according to the present invention.

FIG. 5 shows the characteristics of the effective flux, induced electromotive force and the terminal voltage versus the angular rotating speed of the permanent magnet type synchronous motor.

The induced electromotive force E is determined by a constant magnetic flux $\Phi$ generated by the permanent magnets arranged in the rotor and an angular rotating speed $\omega$ of the electric motor. That is, as shown in FIG. 5(a), if the constant magnetic flux $\Phi 1$ is constant, the induced electromotive force E1 is proportionally increased as the angular rotating speed $\omega$ (rotating speed) is increased.

However, since there is a limitation in the output voltage of the inverter due to the terminal voltage of the power supply and the capacity of the inverter, there is also a limitation in the induced electromotive force generated by the electric motor. Therefore, in the range above a certain rotating speed of permanent magnet type synchronous motor, it is necessary to perform what is called the field weakening control in order to reduce the magnetic flux generated by the permanent magnets.

Since the induced electromotive force is increased in proportion to the angular rotating speed, the current of the field weakening control must be increased. Therefore, a large current needs to be conducted to the coil of primary conductor, and consequently the heat generated in the coil is increased, which may result reducing of the efficiency as a motor in a high rotating speed range and demagnetization of the permanent magnets due to heat generation exceeding the cooling capacity.

Figure 5A:
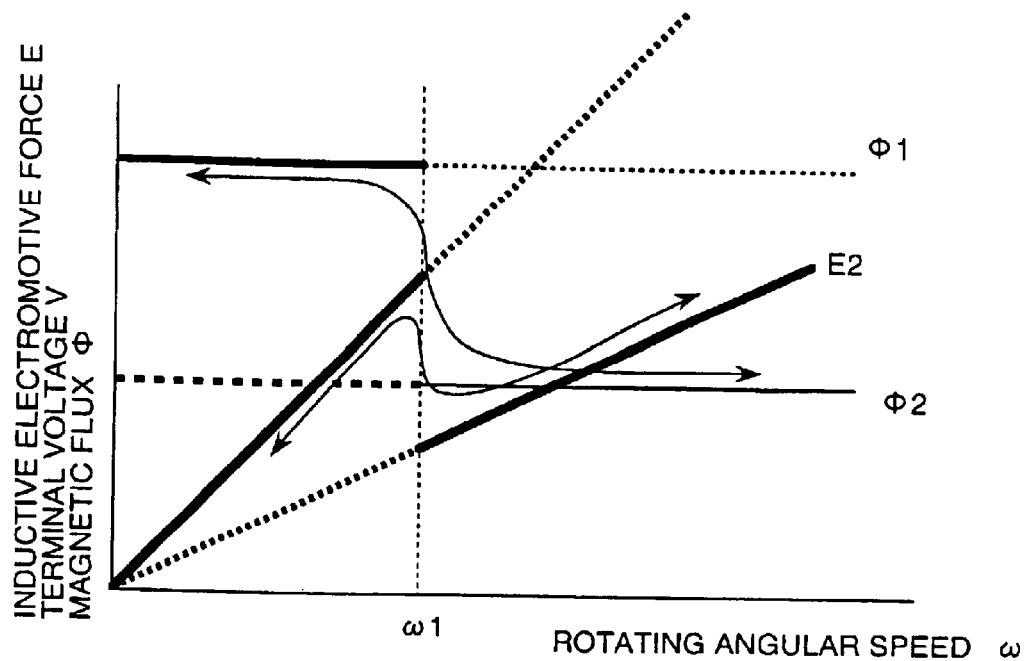
FIG. 5 is graphs showing various kinds of characteristics versus rotating speed of the motor in FIG. 1.

For example, as shown in FIG. 5(a), when the magnetic flux $\Phi 1$ generated by the permanent magnets arranged in the rotor is changed to the magnetic flux $\Phi 2$ at a point of the angular rotating speed $\omega 1$ (rotating speed), the induced electromotive force E1 of the motor is changed to the induced electromotive force E2. By this characteristic, the maximum value of the induced electromotive force can be limited.

Figure 5B:
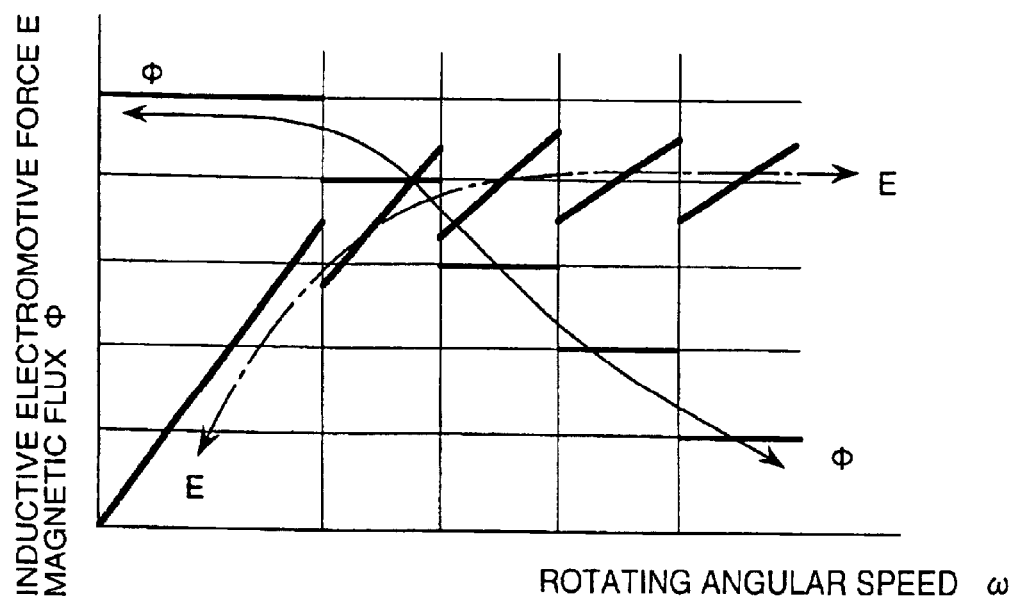

Similarly, FIG. 5(b) is a schematic graph showing that when the magnetic flux $\Phi$ is changed little by little corresponding to the angular rotating speed $\omega$ (rotating speed), the induced electromotive force E can be maintained constant.

Figure 6:
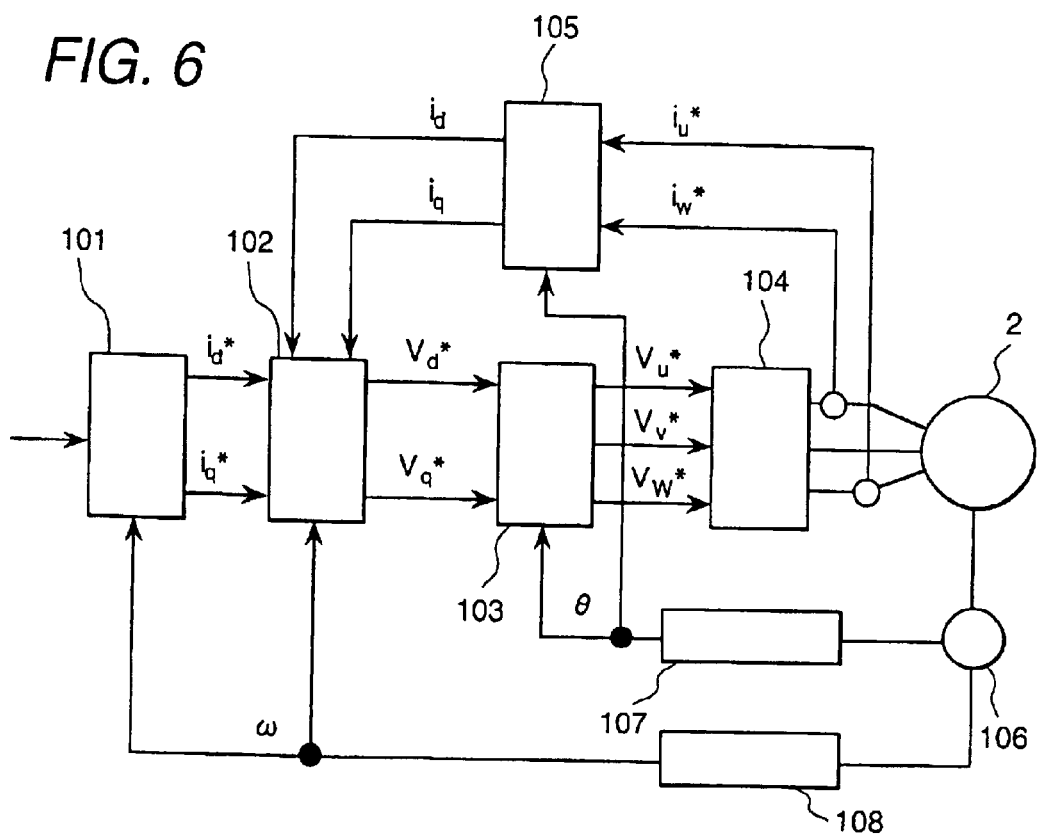
FIG. 6 is a control block diagram of the motor in FIG. 1.

In an embodiment of a means for obtaining the characteristics shown in FIG. 6, the first field magnet of a motor is fixed to a shaft, and the second field magnet is provided movably and freely with respect to the shaft. The shaft and the second field magnet have screw functions to be connected to each other by forming a bolt screw portion in the shaft and a nut portion inside the second field magnet. Further, a stopper is provided at a position apart from a side surface of the second field magnet, and a servo mechanism capable of moving the stopper in parallel to the shaft according to a rotating speed is provided.

FIG. 6 shows the configuration of a control circuit of the main shaft electric motor.

FIG. 6 shows the control block of electric motor 2 shown in FIG. 1. The same configuration is applicable not for main shaft motor 2 but also for each of axis feeding motors 71, 72, and 73.

First of all, drive judgment part 101 judges the drive operation of permanent magnet type synchronous motor 2 based on the set information from a operating pendant (76 in FIG. 1), the information (tool number, position information, etc.) from sensors provided on the main shaft and each axis feeder, and the number of revolution of permanent magnet type synchronous motor 2, and outputs the electric current instruction value. The current instruction value output from drive judgment part 101 is input to current control block 102 for calculating an output voltage instruction according to the difference between the input value and the present current value of permanent magnet type synchronous motor 2 and outputting.

The output from current control block 102 is converted into a three-phase alternating current in rotational coordinate transformation part 103, and controls permanent magnet type synchronous motor 2 through PWM inverter main circuit 104. Each phase current of permanent magnet type synchronous motor 2 is converted into the biaxial current by detecting each phase current (at least two phase currents) and the number of revolution (the number of revolution of a turbine may be used. Further, the multiplied value of the number of revolution of the turbine may be used if there is a transmission.), and fed back to the current instruction value. Further, the number of revolution, the magnetic pole position, etc. are detected by detector 106, and fed back to each control block through magnetic pole position transformation part 107 and speed transformation part 108.

Although the embodiment of FIG. 6 comprises a position-and-speed sensor of motor 2 and a current sensor of the motor, a control circuit of a sensor-less structure for driving motor 2 without part of these sensors may be applicable.

Further, since in the permanent magnet type synchronous motor of the present invention, the pole centers of equal-polarity of the first and the second rotors are brought in phase or out of phase corresponding to the operating condition, the permanent magnet type synchronous motor of the present invention has a function of correcting a lead angle of current supply by a controller for controlling the inverter corresponding to a positional shift angle of the composite magnetic pole of the first field magnet and the second field magnet.

An embodiment for correcting the lead angle of current supply will be described below.

When the motor is operated by fixing the first field magnet to a shaft, by connecting movably and freely the second field magnet with respect to the shaft, and by forming a bolt screw portion in the shaft and a nut portion inside the second field magnet to add screw functions to be connected to each other to the shaft and the second field magnet, the second filed magnet is moved in the axial direction while being rotated.

Figure 13:
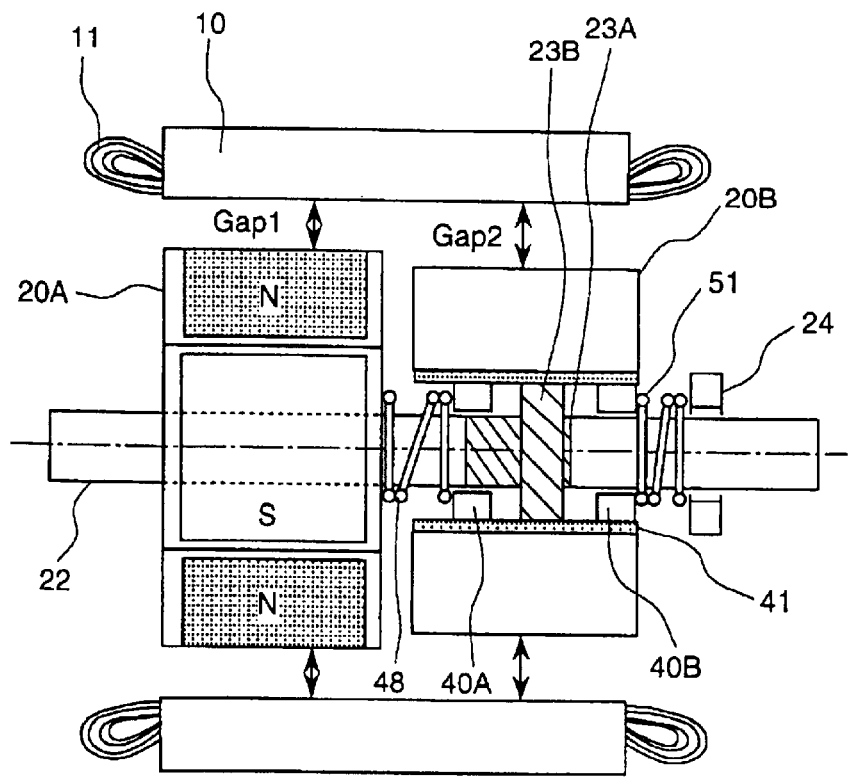
FIG. 13 is a schematic view showing a rotor of another embodiment of a motor in accordance with the present invention (adding gap difference).

FIG. 13 shows the relationship between rotation angle and displacement in the axial direction when the pole centers of equal-polarity of the first rotor and the second rotor are in phase or out of phase corresponding to the operating condition.

Figure 16:
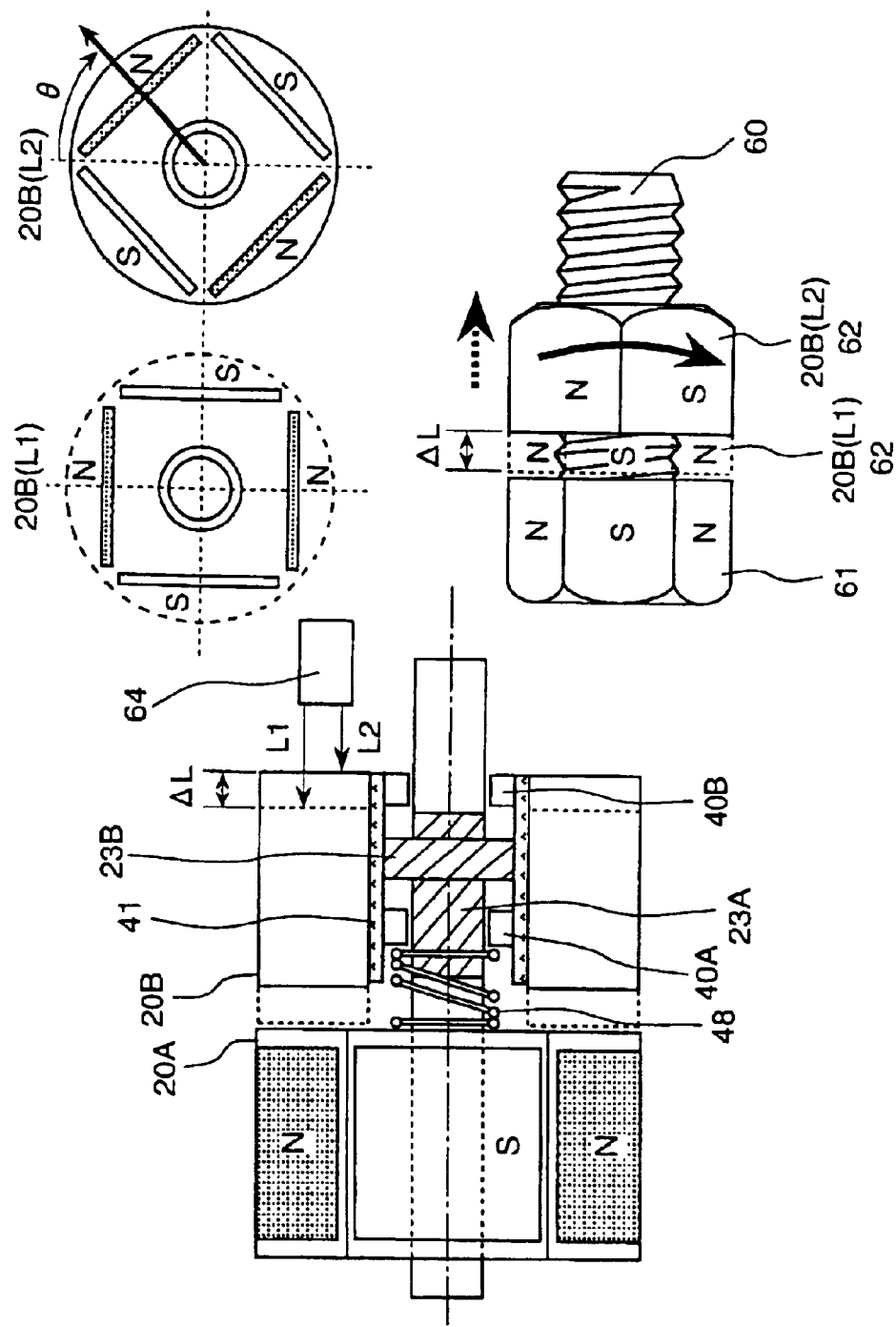
FIG. 16 is a schematic view showing the axial direction displacement measurement of another embodiment of a motor in accordance with the present invention.

Referring to FIG. 16, since there is a proportional relationship between the rotation angle θ and the axial displacement ΔL of the second rotor, the axial displacement ΔL is measured using a displacement meter 64, and fed back to the control circuit of the inverter to use for optimum control to correct the lead angle of current supply as a converted value of the shift angle of the composite magnetic pole position of the first field magnet and the second field magnet.

Figure 7:
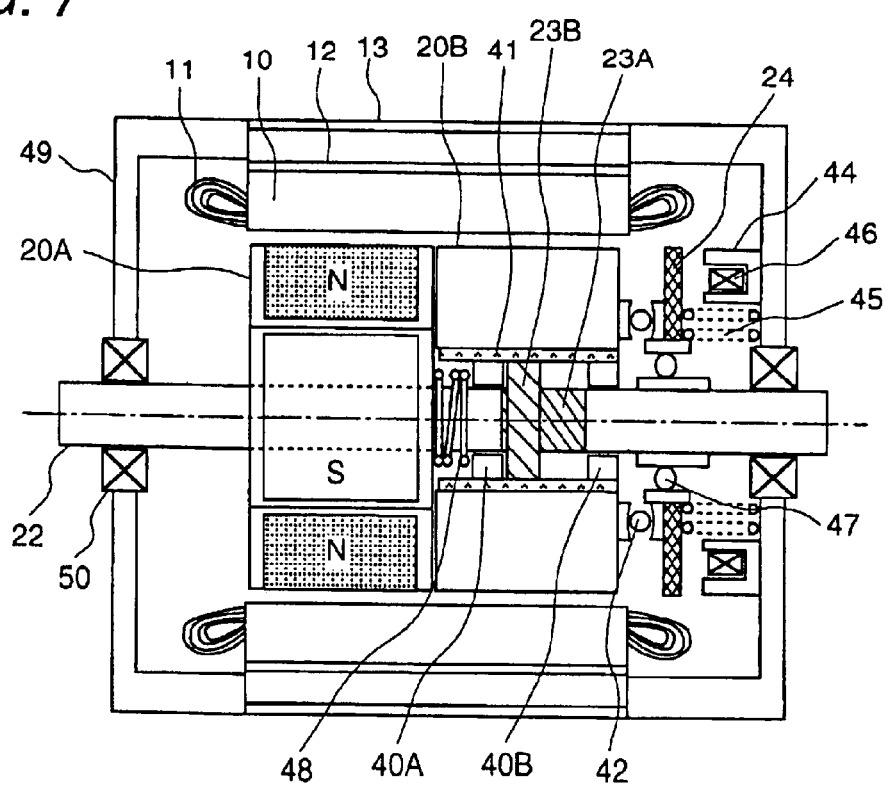
FIG. 7 is a view showing another embodiment of a motor in accordance with the present invention (an actuator in OFF state).

FIG. 7 is a view showing another embodiment of a motor according to the present invention.

First rotor 20A is fixed to shaft 22, second rotor 20B is connected movably and freely with respect to shaft 22, bolt screw portion 23A is formed in part of the shaft, sleeve 41 is fixed to the inside of the second field magnet, and nut portion 23B is fixed to the inside of sleeve 41. Thus, second rotor 20B is rotated with respect to first rotor 20A while the gap between first rotor 20A and second rotor 20B is being widened as if a nut portion were screwed off from a bolt screw portion.

When change in flux linkage occurs between the inside of the second field magnet and shaft 22 as the second rotor is rotated because there is a small play between the second field magnet and shaft 22, a trouble such as electrolytic corrosion may occur. Therefore, sleeve 41 is made of a non-magnetic material having an electric resistivity higher than that of iron. By doing so, the inside of the second field magnet and shaft 22 are magnetically and electrically insulated by sleeve 41.

Supporting mechanisms 40A, 40B are arranged inside sleeve 41 so as to guide rotating motion, reciprocal motion and the composite motion between the second field magnet and the shaft.

Second rotor 20B is connected to the shaft by forming a screw function of bolt screw portion 23A in part of the shaft, and movable stopper 24 is arranged at a position apart from a side surface of the second field magnet, and supporting mechanisms 42, 47 are arranged between stopper 24 and the shaft, and between the stopper and the side surface of second rotor 20B so as to guide rotating motion, reciprocal motion and the composite motion between the second rotor with respect to the shaft. Supporting mechanism 42 has a function of a thrust bearing, and the supporting mechanism 47 has a function of guiding the rotating motion, the reciprocal motion and the composite motion though it is a radial bearing.

Further, there is an effect that the function of supporting mechanism 42 is improved as the thrust bearing by arranging spring 48.

Description will be made below on a magnetic clutch as an example of the servomechanism capable of moving stopper 24 in parallel to the shaft.

The structure of the magnetic clutch is that coil 46 is wound around yoke 44, and stopper 24 may also serve as a movable core. Yoke 44 and coil 46 are fixed to frame 49 of the motor or to a part of the body (not shown). Spring 45 is arranged between yoke 44 and stopper 24 so as to have a function of a reset device at braking excitation. Bearing 50 is arranged between frame 49 and shaft 22 to support shaft 22.

Figure 8:
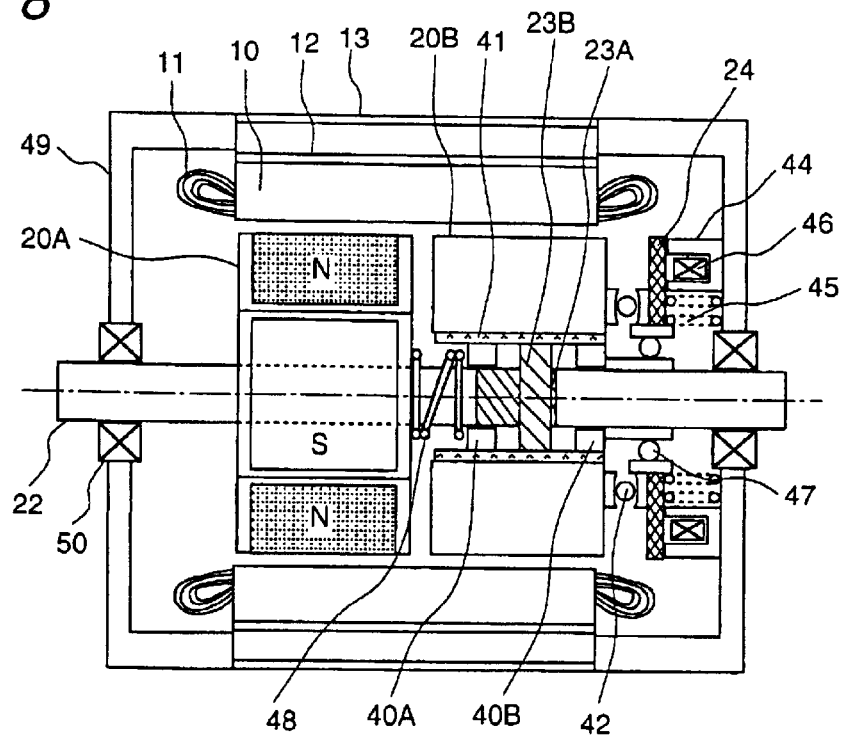
FIG. 8 is a view showing another embodiment of a motor in accordance with the present invention (an actuator in ON state).

FIG. 7 shows coil 46 under a non-excited state, and FIG. 8 shows coil 46 under an excited state.

Yoke 44 becomes a strong magnet by exciting coil 46 to attract stopper 24 also having the function as the movable core.

The magnetic clutch shown herein is an example of a servo mechanism capable of moving stopper 24 in parallel to the shaft, positioning of the stopper can be more accurately performed by employing a hydraulic actuator, a linear driving device using a rotating machine and a ball screw, a linear motor or the like.

Figure 9:
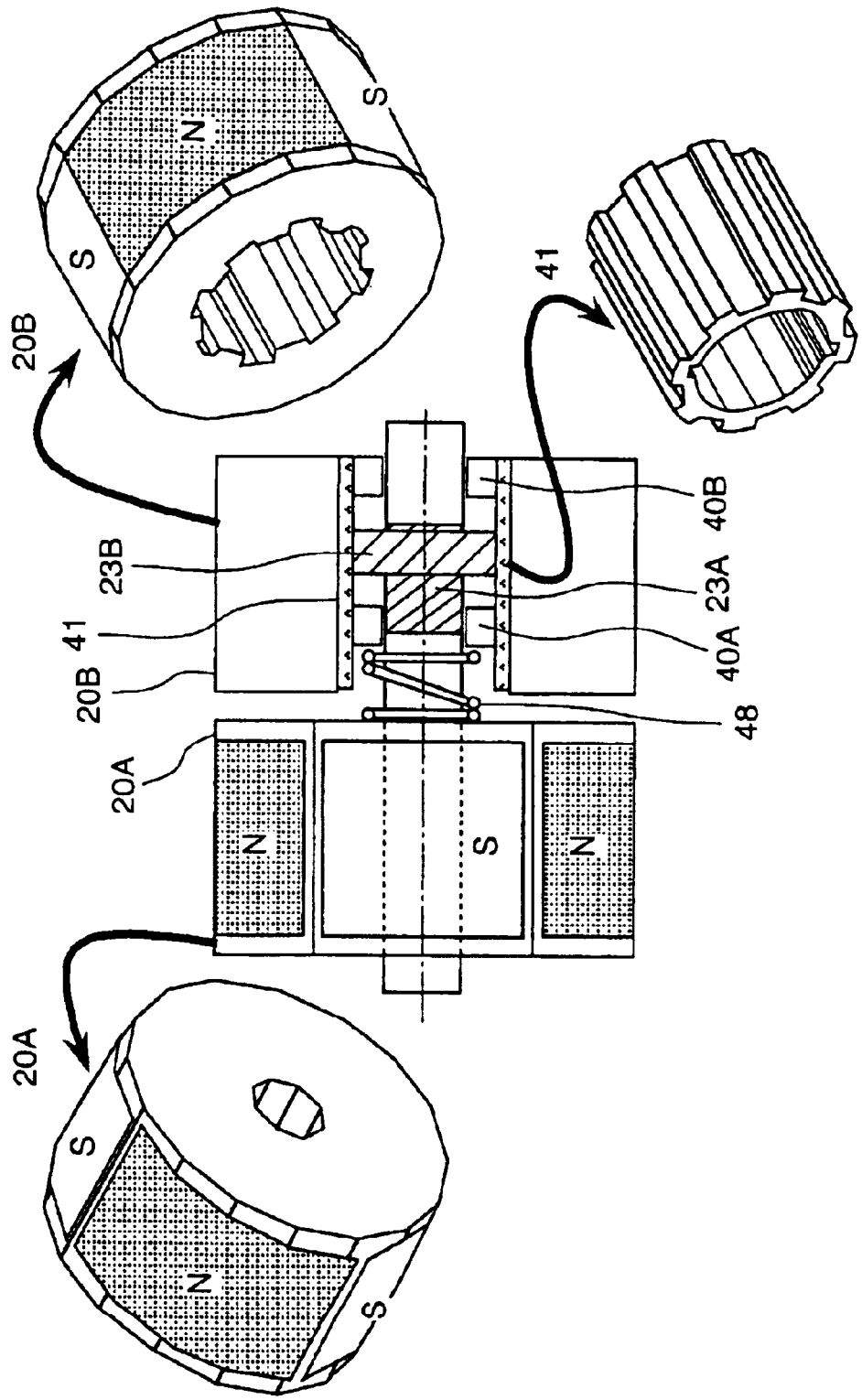
FIG. 9 is a view showing the inside of the rotor of another embodiment of a motor in accordance with the present invention.

FIG. 9 shows an example of sleeve 41 to be fixed to the inside of second rotor 20B.

As one of methods of fixing the second rotor and the shaft, second rotor 20B and sleeve 41 are fixed by forming projected and depressed portions on the contact surfaces of the two parts. Difference in the structure of the inside portions between first rotor 20A fixed to shaft 22 and second rotor 20B separated from shaft 22 is shown.

FIG. 10 shows another embodiment of the present invention.

Depressed portion 53 is formed on a side surface of the first field magnet where the first field magnet and the second field magnet are in contact with each other, and projected portion 54 also serving as the function of the sleeve is formed in the second field magnet. Projected portion 54 and sleeve 41 may be formed in a unit. By doing so, a sufficient space for sleeve 41 can be secured. Therefore, this is one of methods of obtaining a motor having the second rotor of a thin axial thickness by effectively arranging spring 48, supporting mechanisms 40A, 40B and nut portion 23B.

Figure 11:
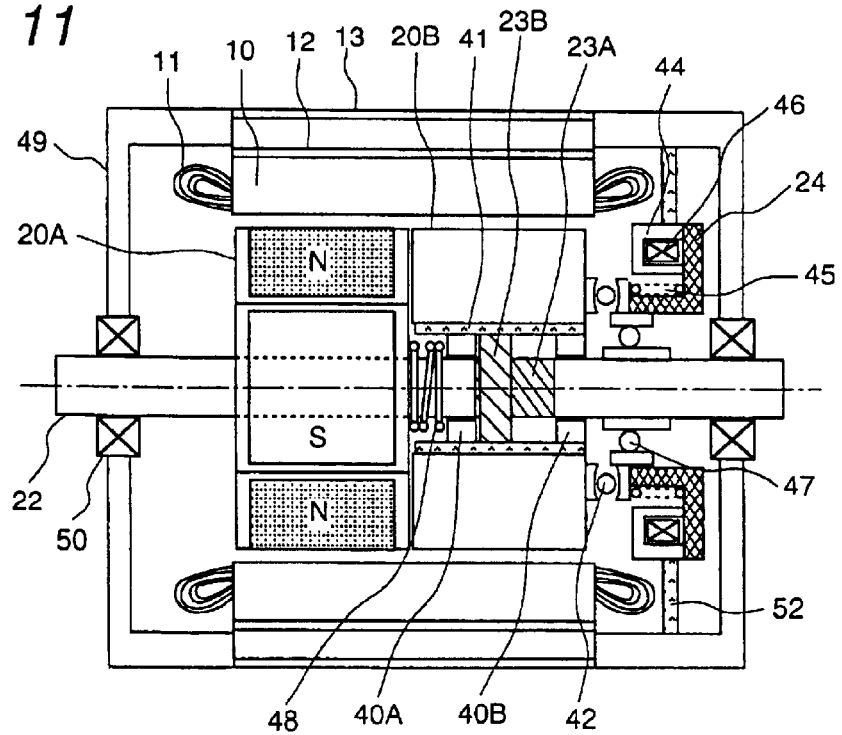
FIG. 11 is a view showing another embodiment of a motor in accordance with the present invention (an actuator in ON state).

FIG. 11 shows another embodiment of the present invention.

The basic components shown in FIG. 11 are the same as those of FIG. 7, but a part corresponding to the magnetic clutch is changed. FIG. 11 shows coil 46 under the excited condition, and yoke 44 is detached from stopper 24 by spring 45 at cutting off the excitation. Further, the embodiment has a characteristic that a thrust force is applied to second rotor 20B by the screw function due to an interaction between bolt screw portion 23A on which torque is applied and nut portion 23B. Therefore, when the excitation of coil 46 is cut off, stopper 24 is detached from yoke 44 by adding the thrust force to push out stopper 24 due to the interaction between the screw and the torque. Yoke 44 is fixed to frame 49 through arm 52, or to a part of the compressor, not shown.

Similarly to FIGS. 7 and 8, the magnetic clutch shown in FIG. 11 is an example of a servo mechanism capable of moving stopper 24 in parallel to the shaft, positioning of the stopper can be more accurately performed by employing a hydraulic actuator, a linear driving device using a rotor and a ball screw, a linear motor or the like.

Figure 12:
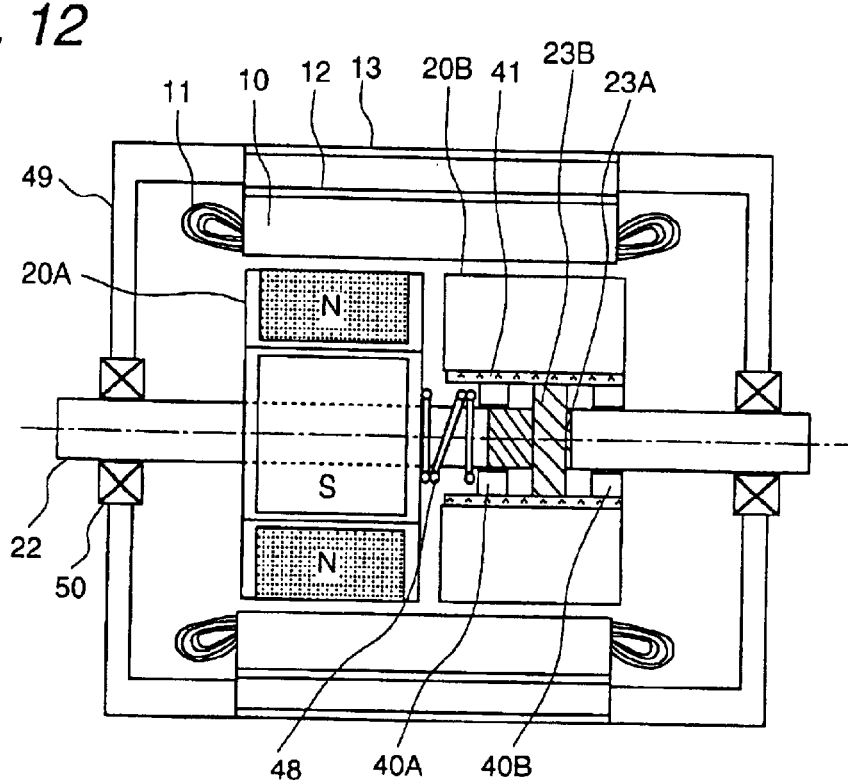
FIG. 12 is a view showing another embodiment of a motor in accordance with the present invention.

FIG. 12 shows other embodiments of the present invention.

FIG. 12 shows an example of stationary stopper 24. A plurality of springs 48 and 51 are arranged between the stopper 24 and the second rotor 20B and between first rotor 20A and second rotor 20B, respectively. Thereby, there is an effect in that rapid fluctuation in second rotor 20B can be suppressed, and motion of second rotor 20B by the torque direction can be assisted.

Of course, the component parts shown by the figures can be combined by various methods, or can be added or eliminated depending on the purpose of use.

FIG. 13 shows the dynamo-electric machine according to another embodiment of the present invention.

The motor in accordance with the present invention is characterized in that first rotor 20A is firmly fixed to shaft 22, but second rotor 20B has freedom to the shaft. Therefore, there is a small play in the mechanical dimension between second rotor 20B and shaft 22, and accordingly second rotor 20B may become eccentric when large torque or a centrifugal force is applied to second rotor 20B. Air gap 2 between second rotor 20B having the second field magnet and the stator is made larger than air gap 1 between first rotor 20A having the first field magnet and the stator. By doing so, the mechanical contact between second rotor 20B and the stator caused by decentering can be prevented.

Figure 14:
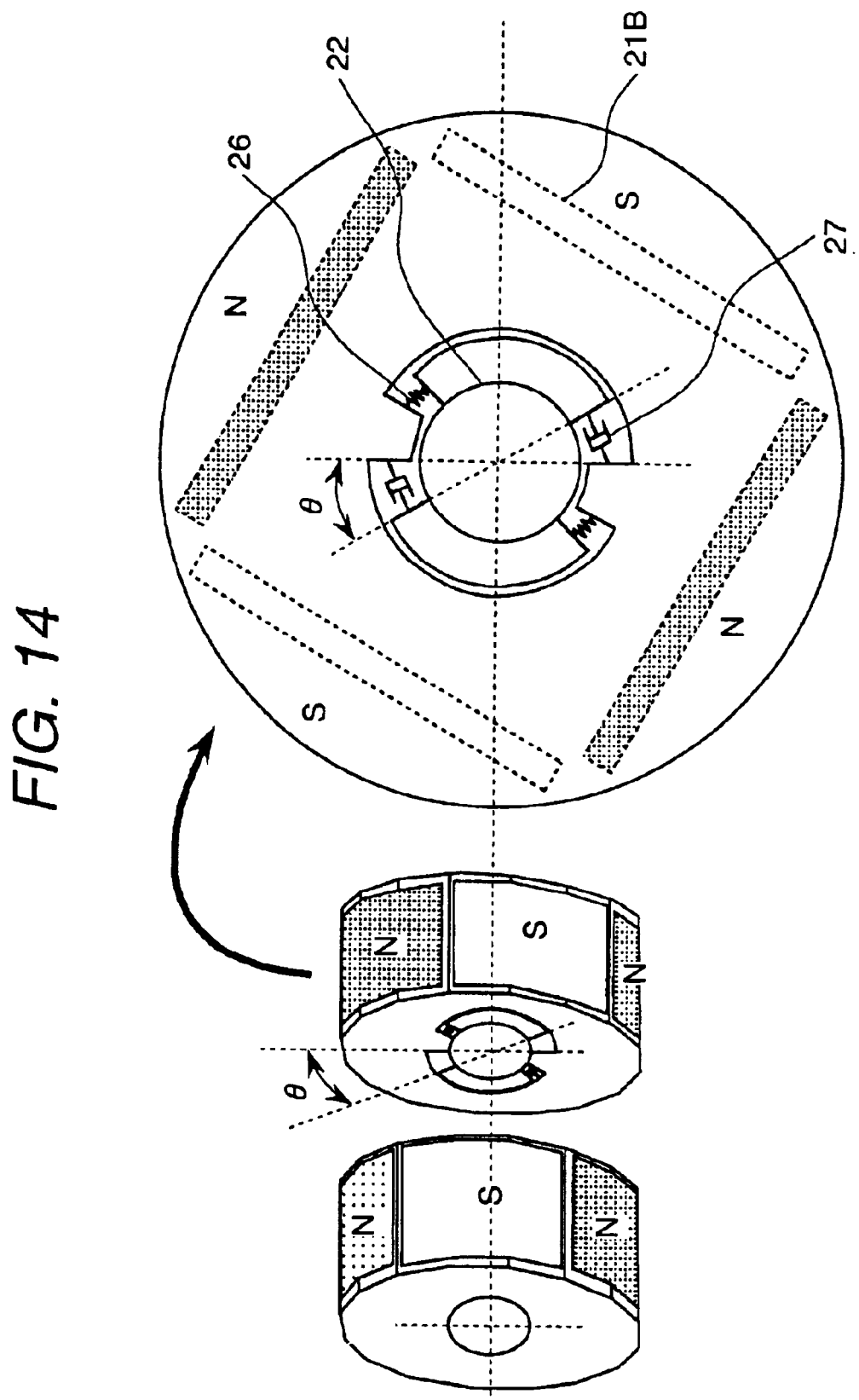
FIG. 14 is a schematic view showing a rotor of another embodiment of a motor in accordance with the present invention.

FIG. 14 shows the dynamo-electric machine according to another embodiment of the present invention.

This is a permanent magnet type synchronous dynamo-electric machine in which screw 23 of the second rotor shown in FIG. 2 is eliminated, and the mechanism where the rotating angle θ can be moved is provided.

The concavo-convex portion is provided to shaft 22 like the cogwheel instead of the screw part of the second rotor shown in FIG. 2, and the convexo-concave portion is provided to insert the shaft on the inner diameter side of the second rotor. However, only fixed rotating angle θ can be moved by enlarging the width of the ditch more than the width of the engaging teeth when shaft 22 is inserted into the inner diameter side of the second rotor. Further, a rapid collision can be softened by providing spring 26 and dumper 27 between the engaging teeth and ditches.

Figure 18:
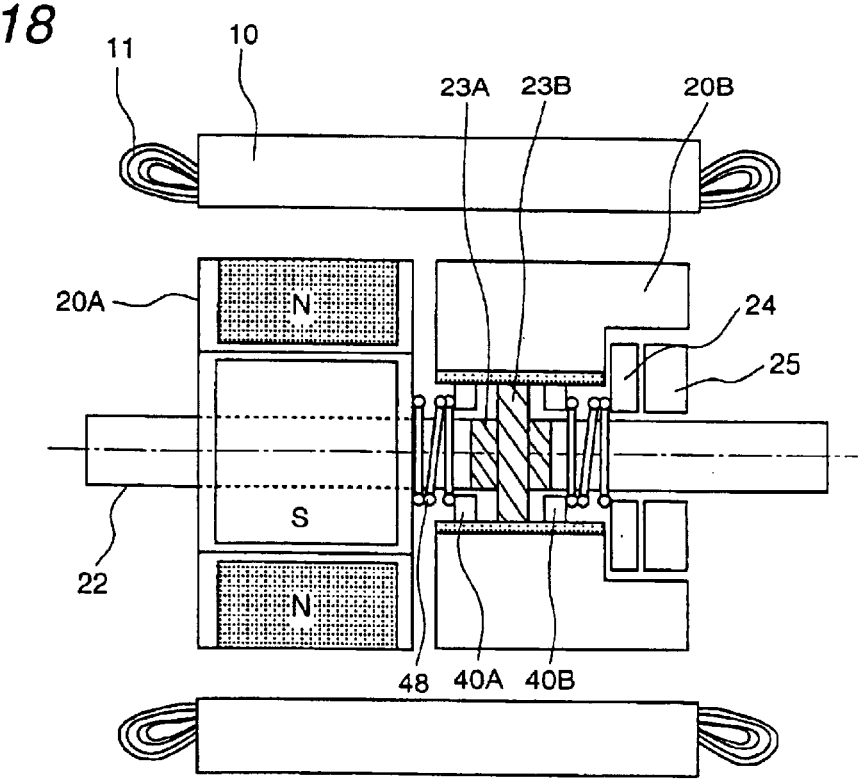
FIG. 18 is a schematic view showing a rotor of another embodiment of a motor in accordance with the present invention (a stopper is arranged inside of the second rotor).

FIG. 18 shows the electric motor according to another embodiment of the present invention.

The motor in accordance with the present invention is characterized in that the inner size of second rotor 20B is shorter than its outer size, and stopper 24 and servo mechanism 25 are provided inside of second rotor 20B. Therefore, there is an effect that the length of the whole rotor including stopper 24 and servo mechanism 25 is suppressed.

Figure 15:
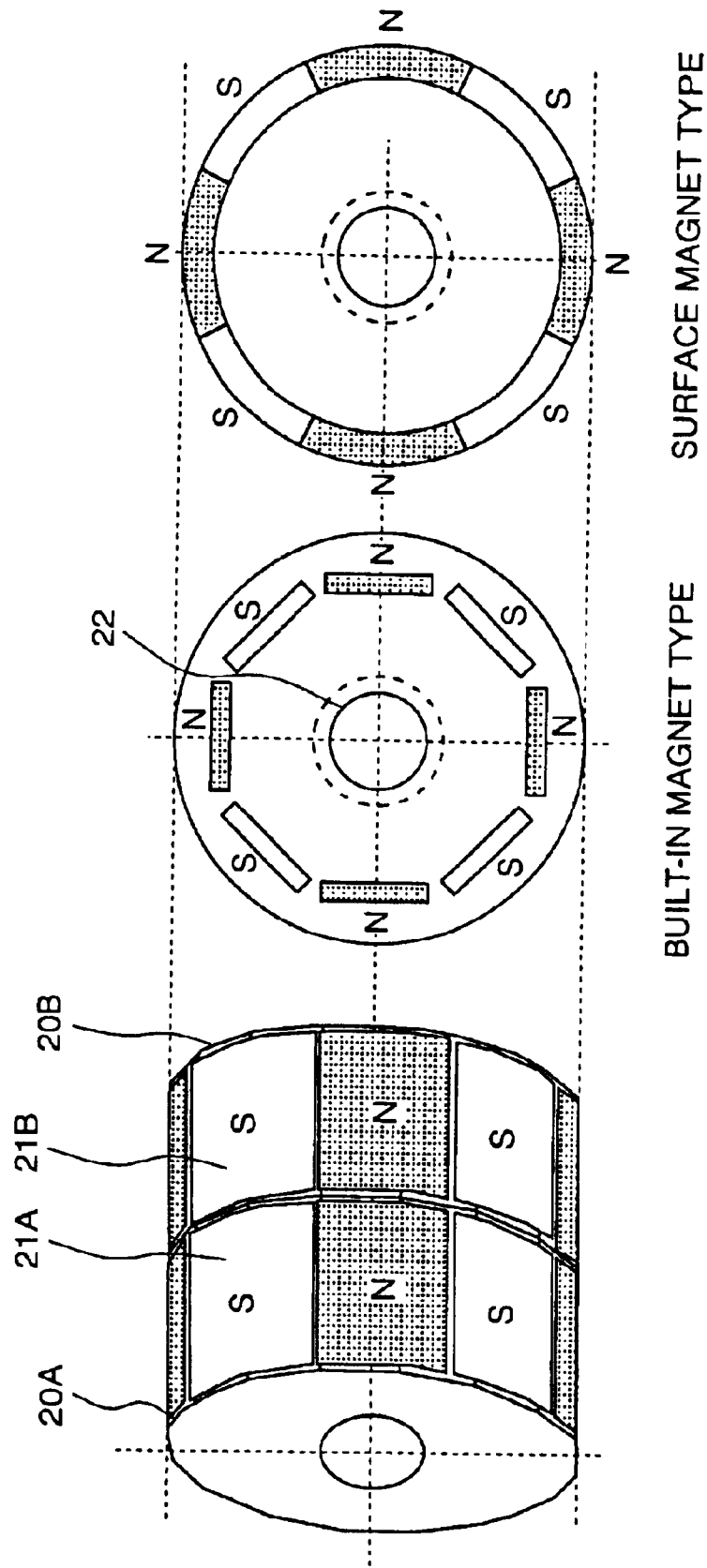
FIG. 15 is a schematic view showing a rotor of another embodiment of a motor in accordance with the present invention (a case where the present invention is applied to an 8-pole motor).

Although the above explanation of the present invention has been made on the four-pole motor, there is no need to say that the present invention can be applied to a two-pole motor or a six-pole motor. As an example, FIG. 15 is a schematic view showing a rotor of a permanent magnet type synchronous motor in which the present invention is applied to an eight-pole motor. Further, the present invention can be applied to any type of rotor, an embedded magnet type or a surface magnet type.

Figure 17:
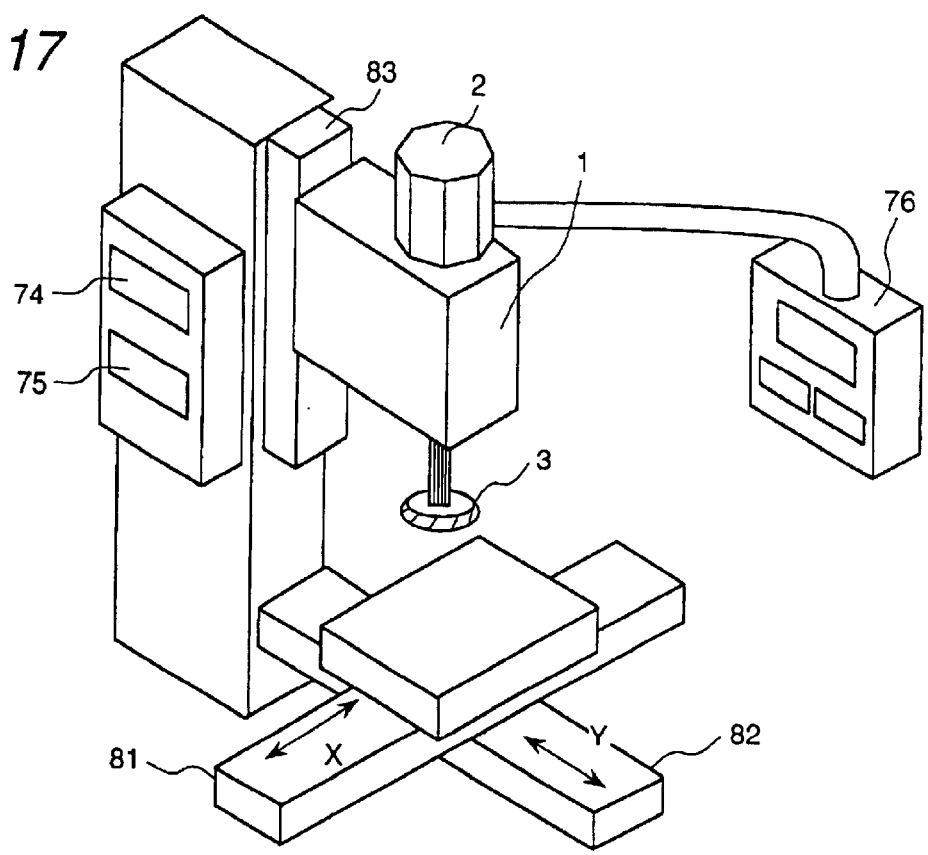
FIG. 17 is a schematic view showing another machine tool in which the electric motor in accordance with the present invention is provided.

FIG. 17 shows an outline of the configuration in which the electric motor of the present invention is used as a main shaft electric motor, and a linear motor is used as an axis feed mechanism.

Recently, the machine tool which adopts a linear motor has been increasing, because the direct axis sending by the linear motor has many merits that the axis sending is smoother and the transportation speed is faster than the axis feeder by the combination of a rotating machine and a ball screw.

Of course, a composite type axis feeder in which the axis sending by linear motor is used in one axis and the axis sending by the combination of the rotating machine and the ball screw is used in the other axis is also acceptable.

Since the permanent magnet type synchronous motor in accordance with the present invention is constructed in that the pole centers of the first and the second field magnets are varied, there is the effect that the amount of the effective magnetic flux by the permanent magnets opposite to the stator magnetic poles can be varied, and it is suitable for an electric motor for a machine tool to which the wide range variable speed control is required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A machine tool providing desired machining for a work by relatively moving a tool and said work, comprising:
   a main shaft for installing a tool;
   an electric motor provided at the shaft head, for rotating said main shaft;
   an inverter circuit for driving said electric motor;
   a controller for controlling said inverter circuit, and
   a tool data setting means for pre-setting the magnitude of the power output of said electric motor which is suitable for the working condition of each said tool used, the desired working being done to a work piece by moving relatively said tool and said work piece, wherein
   said electric motor comprises:
   a stator having a primary winding, and a stator field magnet and
   a rotor having a field magnet to be placed in opposition to said stator field magnet and a shaft, said field magnet comprising a first field magnet having different polarity magnetic poles sequentially arranged in a rotating direction and a second field magnet rotatable relative to said first field magnet and having different polarity magnetic poles sequentially arranged in a rotating direction, and
   a shifting mechanism for shifting said second field magnet relative to said first field magnet in axial and rotating directions depending upon a balance between a magnetic action force between said first field magnet and said second field magnet and a torque generated in said rotor;
   said rotor rotating in forward direction when said electric motor is driven at low speed for rotatingly driving said main shaft, and
   said shifting mechanism placing magnetic pole centers of said first field magnet and said second field magnet in phase by balance of said magnetic action force between said first field magnet and said second field magnet and said torque generated in said rotor when said rotor is rotating in forward direction, and placing magnetic pole centers of said first field magnet and said second field magnet out of phase for reversal of direction of the torque generated in said rotor when said rotor is rotating in reverse direction.

2. A machine tool according to claim 1, wherein said first field magnet is fixed to said shaft;
   said second field magnet is provided movably relative to said shaft; and
   said second field magnet and said shaft are connected by a thread function consisted of a bolt function provided in said shaft and a nut function provided in said second field magnet.

3. A rotary electric machine according to claim 2, a sleeve is inserted between the inside of said second filed magnet and said shaft to fix said second field magnet to said sleeve, and said sleeve is fixed on inner periphery side of said second field magnet.

4. A rotary electric machine according to claim 3, wherein said sleeve is made of a non-magnetic material having an electric resistivity higher than that of iron.

5. An electric motor according to claim 2, wherein a plurality of springs is arranged before and after said second field magnet to guide the rotational motion and the reciprocal motion and the composite motion of said second field magnet.

6. An electric motor according to claim 2, wherein a depressed portion is formed on a side surface of said first field magnet where said first field magnet and said second field magnet are in contact with each other, a projecting portion also serving as a function of said sleeve is formed on a side surface in said second field magnet contacting with said first field magnet, said projecting portion serves as a sleeve for electrically and magnetically isolating between said second field magnet and said shaft.

7. An electric motor according to claim 2, wherein an air gap between said rotor having said second field magnet and said stator is larger than an air gap between the rotor having said first field magnet and said stator.

8. An electric motor according to claim 1, wherein a stopper has a servomechanism capable of moving said stopper in parallel to said shaft according to a rotating speed of said motor as needed.

9. An electric motor according to claim 8, wherein said stopper has a servomechanism capable of moving said stopper in parallel to said shaft according to a rotating speed of said motor as needed.

10. An electric motor according to claim 9, wherein said stopper and said servo mechanism are provided inside of said second field magnet.

11. An electric motor according to claim 8, wherein said stopper has a supporting mechanism for guiding rotational motion and reciprocal motion and the composite motion to said second field magnet and said shaft.

12. An electric motor according to claim 1, wherein a lead angle of current supply by a controller for controlling said controller is corrected corresponding to a positional shift of a composite magnetic pole of said first field magnet and said second field magnet.

13. An electric motor according to claim 1, wherein a lead angle of current supply by a controller for controlling is corrected corresponding to a positional shift angle of a composite magnetic pole of said first field magnet and said second field magnet.

14. An electric motor according to claim 1, wherein a plurality of supporting mechanisms capable of guiding rotational motion and reciprocal motion and the composite motion of said second field magnet is arranged between said second field magnet and said shaft.

* * * * *